Oct. 23, 1951 W. B. McLEAN 2,572,045
ANTISKID TIRE CHAIN
Filed Aug. 31, 1946 2 SHEETS—SHEET 1

INVENTOR.
William B. McLean
by his attorneys,
Christy, Parmelee & Strickland

Oct. 23, 1951 — W. B. McLEAN — 2,572,045
ANTISKID TIRE CHAIN
Filed Aug. 31, 1946 — 2 SHEETS—SHEET 2

INVENTOR.
William B. McLean
by his attorneys,
Christy, Parmelee & Strickland

Patented Oct. 23, 1951

2,572,045

UNITED STATES PATENT OFFICE 2,572,045

ANTISKID TIRE CHAIN

William B. McLean, Moon Township, Allegheny County, Pa.

Application August 31, 1946, Serial No. 694,220

2 Claims. (Cl. 152—242)

This invention relates to an improvement in an anti-skid tire chain such as used for automobiles, trucks and the like, and more specifically, to a tire chain of such construction as to be easily mounted without the necessity of jacking up the wheels and to retain its position on the tire so as to work efficiently.

The disadvantages of common types of tire chains are well-known to those that drive automobiles. An outstanding disadvantage is the difficulty involved in mounting the chain on a tire. It is generally necessary to extend one's hands underneath the fenders to stretch the chain in a circumferential direction so as to eliminate kinks and properly space the cross-links about the periphery of the tire. This, of course, results in dirtying one's sleeves, and coupled with the usual necessity of jacking up the wheel, it makes the mounting of chains a dirty, tedious and difficult task.

It has been proposed to provide a steel ring in place of the inner circumferential portion adjacent the sidewall of the tire. While such ring, due to its stiffness and its ability to maintain the cross-links in a given interrelationship, has made the mounting of the chain easier, it has the outstanding disadvantage of being readily subject to breakage inasmuch as it is tightly fastened to the cross-links, hence irregularities on the roadway and the like which displace the contacting cross-links in a circumferential direction result in the direct application of abnormal tensions to such ring to the extent of breaking it after relatively short use. In order to overcome the difficulty in the past such ring has been made stiffer by increasing its cross-sectional area, however this has presented a further disadvantage in that it makes manual deformation of such ring difficult, hence making the mounting thereof a laborious matter.

Other attempts have been made to improve chains by providing a flexible ring instead of the above-mentioned stiff ring as a substitute for the inside circumferential chain and sometimes radially extending flexible retainer elements, such as rubber elements, which have the effect of exerting a radially inward force on the chain. However, such types of chain do not lend themselves to easy mounting on the tire since they must be pulled circumferentially and since they stretch circumferentially, they have a great tendency to become separated from the tire and thrown off by centrifugal force, thus they have many of the disadvantages of the common types of tire chain.

An object of my invention is to provide a novel anti-skid tire chain which is devoid of the above-mentioned disadvantages of common types of chains.

A further object of my invention is to provide an anti-skid tire chain which is very quickly and easily mountable on a tire of an automobile, truck or other vehicle.

A further object of my invention is to provide an anti-skid tire chain having an inside circumferential ring that is sufficiently stiff as to make mounting of the chain a simple matter and which at the same time is not constantly subject to tension loads such as normally caused by chains as they grip the roadway surface.

A still more specific object of my invention is to provide a somewhat stiff, substantially ring-shaped element to be used either in place of or in addition to the inside circumferential portion of an anti-skid tire chain to impart sufficient stiffness to the chain so as to maintain the cross-links in their ultimately desired interrelationship and to connect the chain to such element when used in addition to the circumferential portion in a manner so as to avoid direct and abnormal tensioning of such ring-shaped element and wherein such is practically inextensible in a circumferential direction under tension loads.

A still more specific object of my invention is to provide an anti-skid tire chain comprising a substantially ring-shaped element of rubber or similar flexible material having sufficient stiffness to facilitate mounting of the chain and which is reinforced by a ring-shaped element which is practically inextensible under tension loads and which is capable of withstanding abnormally high tension loads.

Other objects and advantages of my invention will become apparent from a study of the following specification taken with the accompanying drawings wherein.

Figure 1:
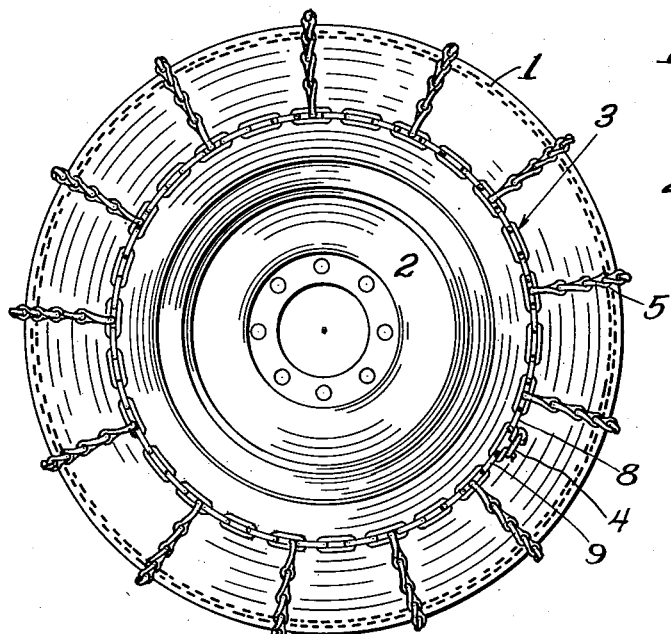
Figure 1 is an elevational view of the outside surface of a tire having an anti-skid chain mounted thereon.

Referring more particularly to Figures 1 to 4, inclusive, of the drawing which show one preferred construction of my invention, numeral 1 denotes a tire mounted on wheel 2 of an automobile, truck or other vehicle on which tire is mounted an anti-skid tire chain 3. The portion of the chain located on the outside surface of the wheel as shown in Figure 1 is conventional, that is, it comprises a circumferentially extending chain portion similar to that extending along the wide surface and whose ends are connected by a connecting link 4 and has a plurality of cross-chains, such as 5, whose ends are connected to the respective circumferentially extending chain portions at spaced points.

Figure 2:
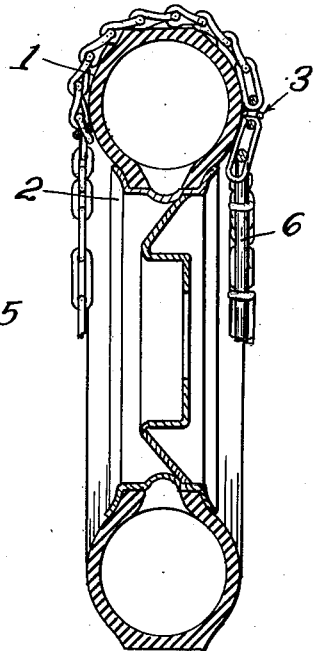
Figure 2 is a cross-sectional view taken along line II—II of Figure 3.
Figures 3, 4:
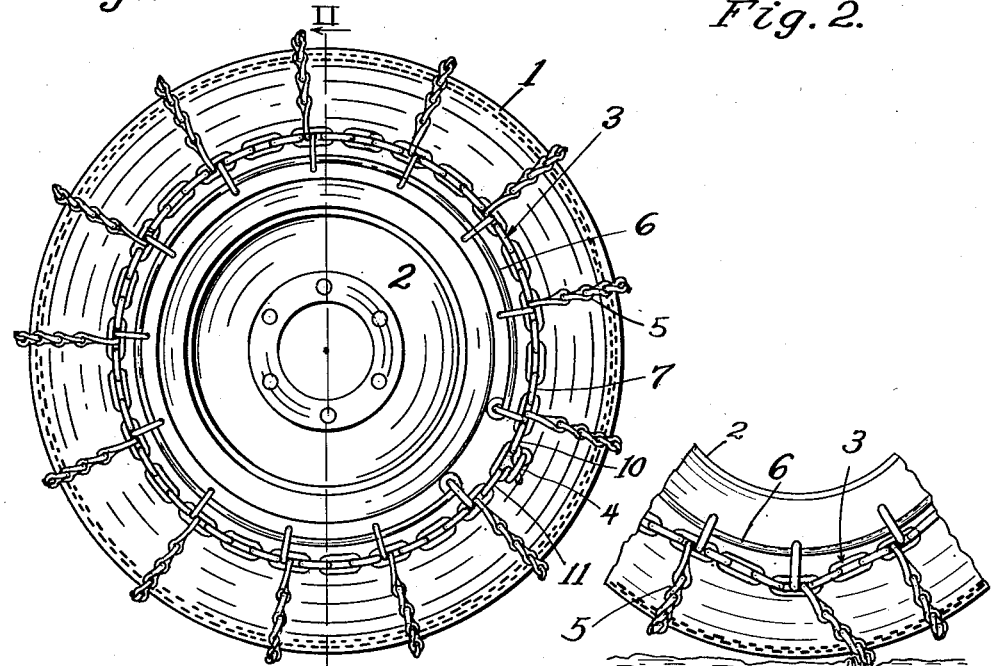
Figure 3 is an inside view of the structure shown in Figures 1 and 2 and including a spring ring element embodying one modification of my invention.
Figure 4 is a fragmentary view of the inside portion of the chain shown in Figure 3 to more clearly illustrate the operation when the cross-chain is pulling on the chain while caught on an obstruction on the roadway surface.

In accordance with my invention I provide a spring ring 6 along the inside surface of the tire, as shown more clearly in Figures 2 and 3, which may be made of spring steel or other material having appreciable stiffness as well as high tensile strength and a small degree of flexibility. Spring ring 6 is discontinuous or split, its ends being looped to form eyelets which are fastened by links to the inside circumferential chain portion 7. The ring is slipped through other circumferentially spaced links connected to portion 7 as more clearly shown in Figure 4 to form a loose coupling therewith. The spring ring 6 in its natural or unstressed condition forms an almost complete circle or near circle whose diameter is a few inches less than that of the inner circumferential chain portion 7. Figure 3 shows spring ring 6 as being spread to a greater diameter than its natural one, therefore tending to pull the chain inwardly and to force the two ends of the chain toward each other.

Spring ring 6 is of such material and cross-section as to give it sufficient resiliency to permit spreading of the two ends thereof far enough apart to enable passing of the ring over the top of the tire without overstressing it. This will permit draping of the chain and spring ring over the top of the tire when applying the chain and will permit the chain and spring ring to drop away from the tire when the connecting links of the chain are unhooked and the car driven off the chain. I have found that satisfactory results may be obtained for a 6.5 x 16 tire by providing a spring ring made of music wire having a diameter of $\frac{3}{16}$ inch and bent to a radius of 9 inches. Such ring, while flexible, will have sufficient stiffness to hold the chain in a circular or oval shape when applied to the tire.

In view of the loose linkage that exists between the ring 6 and the links through which it extends, as shown clearly in Figure 4, it will be readily seen that pulling of the cross-chain, such as caused by being caught on an obstruction on the roadway surface, will be transmitted only to the circumferential chain portions which are flexed radially outwardly and thus tensioned and will never or seldom be transmitted only to ring 6.

The tire chain illustrated in Figures 1 to 4 may be applied in the following manner:

The middle of the spring ring 6 is held against the top of the outside surface of the tire, the ends thereof are pulled apart and hooked one at a time over the back of the tire and then the middle part of the ring is pushed over to the back of the tire. The chain is then adjusted to its proper position around the tire and the outer connecting links 8 and 9 are hooked together. The car is then moved (perhaps in the neighborhood of 18 inches) until the inner connecting links 10 and 11 can be reached easily and the inner connecting links are fastened together. Thus the chain is mounted easily and quickly.

Figure 5:
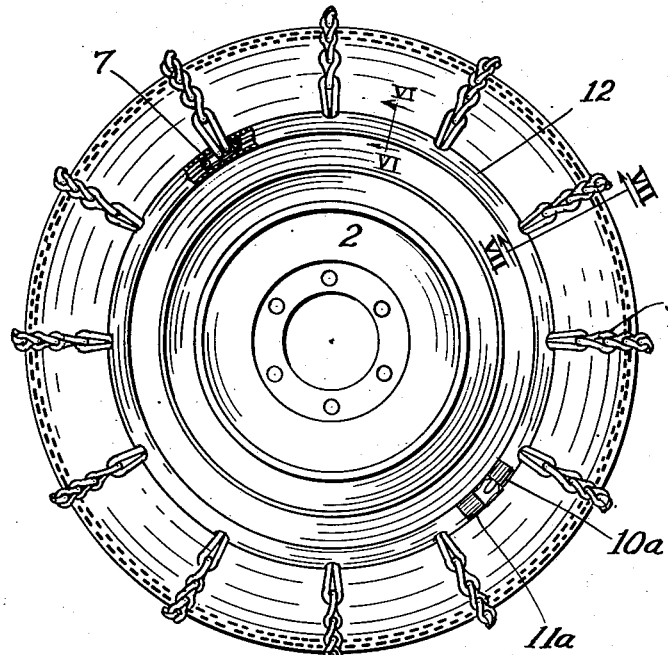
Figure 5 is an elevational view of the inside surface of a tire showing a modified form of spring-like ring element.
Figure 6:
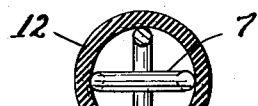
Figure 6 is an enlarged cross-sectional view taken along line VI—VI of Figure 5.
Figure 7:
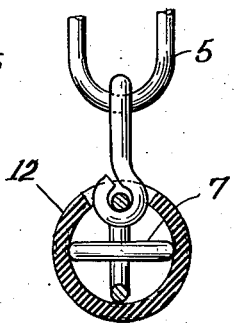
Figure 7 is an enlarged cross-sectional view taken along line VII—VII of Figure 5.

Figures 5, 6 and 7 show a modification of the invention wherein instead of using a spring ring of metal or the like, a tubular ring 12 of rubber or similar material is provided for enclosing the inner circumferential chain portion 7, except for a few links at each end of any well-known standard tire chain. The tubular ring or toroid 12 may be split, as shown, and should have a natural curvature equal to or slightly less than, that is, of shorter radius, than that of the circumferential chain portion 7 when it is on the tire. The wall thickness of the ring or tube should be sufficient so as to give it stability and stiffness along its own curved axis and the tube should be elastic or flexible enough to give it considerable flexibility in the radial and transverse directions. The chain portion 7 may be extended through and molded or bonded or otherwise rigidly secured to the tube 12. It will be noted that the inner circumferential chain portion 7 extending through the rubber tube will not be extensible in a circumferential direction, and will receive the entire tension load resulting from pulling of the cross-chains, none or little of the tension load being transmitted to the tube 12.

Figure 6 shows how the inner circumferential chain portion extends through and acts as a core or reinforcing portion of the rubber tube. Figure 7 shows a preferred form of connection between the individual cross chains and the outer circumferential chain portion 7 extending through the rubber tube.

A tire chain having the construction shown in Figures 5, 6 and 7 may be mounted in substantially the same manner as that shown in Figures 1 to 4. However, it will be found that the mounting thereof is an even simpler task than the mounting of a tire chain such as shown in Figures 1 to 4. More specifically, in order to mount the type of chain having a tubular flexible ring, the tube and chain are leaned against the wheel with the opening or split in the tube at the bottom of the wheel. The tube is grasped with both hands about 6 inches from each and is pushed together with its accompanying chain in an upward direction so that the top of the tube is forced or looped up and over the top of the tire and underneath the fender (not shown). The flexibility of the tube combined with the weight of the chain will have the advantageous feature of causing the tube to drop down automatically to a certain extent behind the tire without the necessity of reaching underneath the fender. Thus the tube and chain are very easily hooked over the top of the tire and will stay there after the hands are removed from the tube. The two ends of the tube are then hooked over the back of the tire and the outer circumferential chain is quickly adjusted to its proper position around the tire. The tube and inner circumferential chain portion will then automatically drop to the proper or desired position without the necessity of reaching underneath the fenders and soiling one's sleeves which is a highly advantageous feature. The outer connecting links are fastened and the car is moved until the inner connecting links can be reached easily which are then fastened.

As stated before, a material other than rubber can be used for tube 12 so long as it has sufficient stiffness in direct compression along with sufficient elasticity or flexibility in bending.

In some instances the spring ring of Figures 2 and 3 could be fastened to chain portion 7 at intervals instead of on loose links. It may even be possible to replace the inner circumferential chain portion 7 with a ring of rubber or other suitable material having connecting links embedded or bonded thereto for attachment to the cross-chains. However, severe loads would be placed on such ring hence it would have to be designed to withstand them. Such ring might be of solid rubber or similar material and, if desired, reinforced with rope, flexible wire rope, cords of cotton or nylon or other reinforcing material capable of withstanding tension loading. Such a ring should have no or a slight clamping or contracting pressure against the tire (for example, 2 or 3 pounds). This clamping effect is to hold the chain in its correct position for all positions of the wheel but not sufficient to bind the cross-chains to the tire. Such light spring is physically easy to spread over the tire and the light pressure of the cross-chains against the tire permits the cross-chains to adjust themselves or fall into their proper position around the tire when the wheel is moved so that the cross-chains pass under the tire instead of binding against the tire in the position in which it is first put on. Or the spring ring could be made up of a series of stiff segments joined together with springs at each joint. The spring ring may be made of a material having a low modulus of elasticity, such as aluminum or magnesium. Instead of providing a separate tension element as a chain or wire rope and a stiffening element, such as a spring ring or rubber tube, the tension and stiffening element might be combined, such as by providing a wire rope having fine individual wires which will permit the rope to conform to the kinks induced by pull from the cross-chains and wherein the friction between the wires gives the rope as a whole the desired stiffness.

Figure 8:
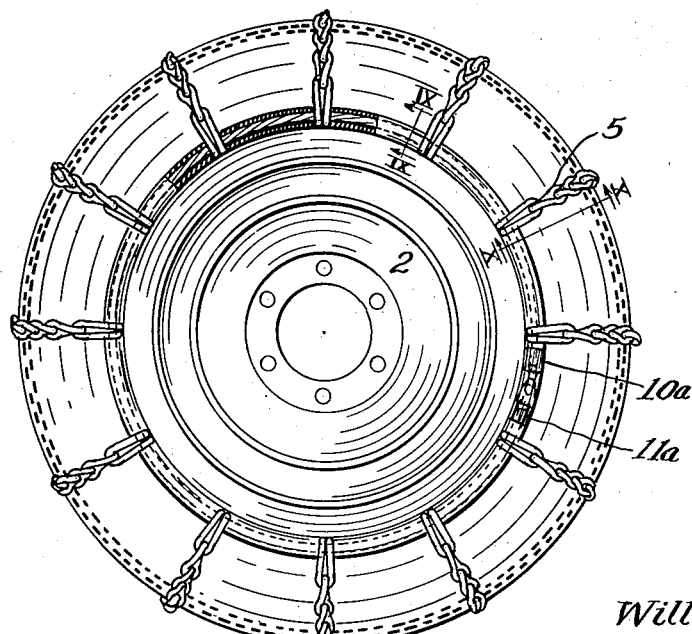
Figure 8 is an enlarged view of the inside surface of a tire showing a further modified form of spring-like ring element similar in some respects to that shown in Figure 5.
Figure 9:
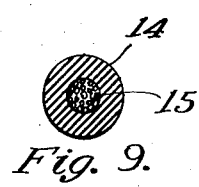
Figure 9 is an enlarged cross-sectional view taken along line IX—IX of Figure 8.
Figure 10:
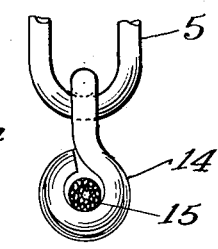
Figure 10 is an enlarged cross-sectional view taken along line X—X of Figure 8.

Figures 8, 9 and 10 show a modified form of ring-like element similar in some respects to that shown in Figure 5 in that it acts both as the tension-carrying element and the stiffening element, thereby eliminating the necessity for a chain portion, such as 7, in Figure 3. The ring-like element has a wire core 15 made up of a plurality of strands. Tubular rubber segments 14 surround this core, the length of such segments corresponding with the space between the cross-chains 5. These segments 14 provide sufficient stiffness, particularly in cases wherein a somewhat flexible wire core 15 is used. Fastening elements of any well-known type, such as 10a and 11a are used for securing the ends of the ring-like composite elements together. As will be seen from the connection between the cross-chains 5 and the uncovered portions of the multiple stranded wire, as shown most clearly in Figure 10, there will be permitted a certain degree of radial movement as a consequence of pulling by the cross-chains. The wire 15 is capable of withstanding direct tension loads resulting from such pulling.

Such ring, on the other hand, may be of such construction as to be readily applied to existing tire chains that include circumferential chain portion 7, for instance, by having suitable clamps connected thereto at spaced portions of the circumference, which clamps may be readily fastened to the inner circumferential chain portion.

Thus it will be seen that I have provided an efficient and relatively inexpensive anti-skid tire chain comprising a tension carrying element (or elements) which is strong and practically inextensible under tension loads and is flexible enough laterally to conform approximately to the stress polygon established by unequal pulls from the cross-chains without overstressing such elements. It will also be seen that I have provided a stiffening element (or elements) which is stiff enough to hold a member approximately in the shape of a ring when it is being handled or applied to the tire so as to make mounting thereof a very simple and quick matter, and which is elastic enough so that it may be manually opened or spread out sufficiently so as to be passed over the tire without overstressing it. It also will be seen that I have provided an anti-skid tire chain which does not become tangled and which is not only readily mountable without the necessity of jacking up the wheel and without dirtying one's sleeves, but whose connecting links are easy to connect due to automatic positioning of the chain into place and which do not require tighteners or spreaders, and which chains are of such construction as to withstand abnormal tension loading resulting from pulling of the cross-chains as they cling to deformities on the roadway surface.

While I have illustrated and described certain specific embodiments of my invention, it will be understood that this is by way of illustration only and that various changes and modifications may be made within the contemplation of my invention and within the scope of the following claims.

I claim:

1. A conventional tire chain having cross-chains adapted to extend transversely of the tread of a tire, and spaced inner and outer side chains to which said cross-chains are connected, said side chains having ends provided with releasable connections by which said ends may be secured together to provide an endless support for said cross-chains extending circumferentially of a tire, said tire chain when mounted on a tire being operable in a conventional manner with said side chains being substantially inextensible in a circumferential direction but movable radially outwardly a limited amount in response to force applied to said cross-chains, and means operable to facilitate mounting said tire chain on a tire comprising a ring-shaped resilient rod having free ends which may be sprung manually relative to each other, and a plurality of spaced links connecting said ring-shaped rod to said inner side chain in substantially concentric relation thereto, said ring-shaped rod having sufficient stiffness to support said chain in a vertical plane when mounting the chain on a tire, said links having parts operable to allow limited but free relative movement between said ring-shaped rod and inner side chain when said tire chain is mounted in position so that said ring-shaped rod is inoperative to transfer stress from one cross-chain to other parts of the chain and thus interfere with the normal operation of said tire chain in its conventional manner.

2. A conventional tire chain having cross-chains adapted to extend transversely of the tread of a tire, and spaced inner and outer side chains to which said cross-chains are connected; said side chains having ends provided with releasable connections by which said ends may be secured together to provide an endless support for said cross-chains extending circumferentially of a tire, said tire chain when mounted on a tire being operable in a conventional manner with said side chains being substantially inextensible in a circumferential direction but movable radially outwardly a limited amount in response to force applied to said cross-chains, and means operable to facilitate mounting said tire chain on a tire comprising a ring-shaped resilient rod having free ends which may be sprung manually relative to each other, and a plurality of spaced links connecting said ring-shaped rod to said inner side chain in substantially concentric relation thereto, each of said links comprising an elongated closed loop of metal embracing the rod and a part of the inner side chain so that said inner chain may move radially relative to said rod a distance dependent upon the length of said elongated loop, said relative movement being sufficient that said rod is inoperative to transfer stress from one cross-chain to other parts of the chain and thus interfere with the operation of the chain in a conventional manner.

WILLIAM B. McLEAN.

REFERENCES CITED

The following references are of record in the file of this patent:

UNITED STATES PATENTS

| Number | Name | Date |
|---|---|---|
| 1,279,317 | Friberg | Sept. 17, 1918 |
| 1,478,059 | Pye | Dec. 18, 1923 |
| 1,441,113 | Pepper | Jan. 2, 1923 |
| 1,628,019 | Wilson | May 10, 1927 |
| 2,020,943 | Hallquist | Nov. 12, 1935 |
| 2,252,778 | Morss | Aug. 19, 1941 |